US006672817B2

(12) United States Patent
Denny

(10) Patent No.: US 6,672,817 B2
(45) Date of Patent: Jan. 6, 2004

(54) BEVERAGE PREPARATION AND DISPENSING CONTAINER

(76) Inventor: Sean P. Denny, 2417 S. 11th St., Springfield, IL (US) 62703

( * ) Notice: Subject to any disclaimer, the term of this patent is extended or adjusted under 35 U.S.C. 154(b) by 128 days.

(21) Appl. No.: 09/770,616

(22) Filed: Jan. 29, 2001

(65) Prior Publication Data
US 2001/0042446 A1 Nov. 22, 2001

Related U.S. Application Data

(63) Continuation-in-part of application No. 09/571,857, filed on May 16, 2000, now Pat. No. 6,372,270.

(51) Int. Cl.[7] .............................................. B65D 81/32
(52) U.S. Cl. ......................... 412/112; 426/77; 426/115; 426/120; 426/110
(58) Field of Search ................ 426/112, 115, 426/120, 107, 234, 113, 241, 243, 110, 77, 82–84; 206/543, 544; 220/254.3, 257.1, 257.2, 258.1, 712, 359.1, 359.4

(56) References Cited

U.S. PATENT DOCUMENTS

| 180,132 | A | | 7/1876 | Hoard et al. | |
|---|---|---|---|---|---|
| 1,489,806 | A | | 4/1924 | Anderson | |
| 1,798,339 | A | * | 3/1931 | Soulis | 426/86 |
| D100,412 | S | | 7/1936 | Carp | |
| 2,328,872 | A | * | 9/1943 | Yealdhall et al. | 426/86 |
| 2,631,521 | A | * | 3/1953 | Atkins | 426/115 |
| 2,766,796 | A | * | 10/1956 | Tupper | 426/86 |
| 2,794,545 | A | * | 6/1957 | Olson | 426/86 |
| 2,824,010 | A | * | 2/1958 | Pedersen | 426/115 |
| 3,102,465 | A | | 9/1963 | Montesano | |
| 3,346,388 | A | | 10/1967 | Andrews et al. | |
| 3,417,897 | A | * | 12/1968 | Johnson | |
| 3,421,654 | A | * | 1/1969 | Nexel | |
| 3,589,272 | A | * | 6/1971 | Bouladon | 426/115 |
| 3,590,989 | A | | 7/1971 | Wittwer | |
| 3,657,994 | A | | 4/1972 | Post | |
| 3,732,999 | A | | 5/1973 | Rounkles | |
| 3,743,520 | A | * | 7/1973 | Croner | 426/115 |
| 3,779,372 | A | * | 12/1973 | Lloret | 426/115 |
| 3,861,284 | A | | 1/1975 | Costello | |
| 3,920,120 | A | * | 11/1975 | Shveda | 426/86 |
| 3,977,559 | A | * | 8/1976 | Lombardi | |
| 4,033,453 | A | * | 7/1977 | Giaimo | 426/86 |

(List continued on next page.)

FOREIGN PATENT DOCUMENTS

| DE | 20003442 | * | 8/2000 |
|---|---|---|---|
| EP | 158511 | | 10/1985 |
| GB | 480596 | | 2/1938 |
| GB | 623195 | | 5/1949 |
| GB | 2250425 | | 6/1992 |
| GB | 2261594 | * | 5/1993 |
| JP | 5-23110 | * | 2/1993 |

Primary Examiner—Steve Weinstein
(74) Attorney, Agent, or Firm—Richard C. Litman

(57) ABSTRACT

Several embodiments of a beverage preparation and dispensing container each include a quantity of potable water (spring water, distilled water, etc.) sealed therein, with a separate concentrated drink mix packet removably secured to the container's outer surface. Each container is relatively short and squat, to provide a good ratio between internal volume and outer surface to more efficiently retain the heat of a heated beverage therein. The container walls are also relatively thick, for the same reason. Each container has a relatively wide mouth, allowing the consumer to slowly sip a beverage from the container and present a large surface area to cooling air, rather than ingesting a large amount at one time and possibly burning the mouth, as would occur with a narrow necked bottle. The drink mix (tea, coffee, powdered or syrup flavoring, etc.) is secured to the container side or top in one of several ways, for convenient access.

8 Claims, 5 Drawing Sheets

U.S. PATENT DOCUMENTS

| | | | |
|---|---|---|---|
| 4,081,103 A | * | 3/1978 | Zoellick |
| 4,167,899 A | * | 9/1979 | McCormick ................. 426/112 |
| 4,221,291 A | * | 9/1980 | Hunt .......................... 426/115 |
| 4,235,343 A | | 11/1980 | Thompson |
| 4,551,336 A | | 11/1985 | Chen |
| 4,592,478 A | | 6/1986 | Laconis |
| 4,756,915 A | * | 7/1988 | Dobry |
| 4,795,055 A | * | 1/1989 | Ingemann |
| 4,821,630 A | | 4/1989 | Roberts |
| 4,883,935 A | * | 11/1989 | Fairchild et al. |
| 4,986,451 A | | 1/1991 | Lowe et al. |
| 5,050,757 A | | 9/1991 | Hidding et al. |
| 5,088,179 A | * | 2/1992 | Gibbon |
| 5,168,140 A | * | 12/1992 | Welker |
| 5,318,791 A | | 6/1994 | Millman et al. |
| 5,477,979 A | * | 12/1995 | Goessling et al. |
| 5,529,179 A | * | 6/1996 | Hanson ....................... 426/115 |
| 5,545,879 A | * | 8/1996 | Brotz |
| 5,623,865 A | | 4/1997 | Sidiropoulos |
| 5,746,113 A | | 5/1998 | Ko |
| 5,839,601 A | * | 11/1998 | Van Melle |
| 5,866,185 A | | 2/1999 | Burkett |
| 5,893,477 A | * | 4/1999 | Kaneko et al. |
| 5,971,195 A | * | 10/1999 | Reidinger et al. |
| 6,165,523 A | * | 12/2000 | Story ......................... 426/112 |
| 6,260,727 B1 | * | 7/2001 | Durdon |

* cited by examiner

BEVERAGE PREPARATION AND DISPENSING CONTAINER

REFERENCE TO RELATED PATENT APPLICATION

This patent application is a continuation in part of U.S. patent application Ser. No. 09/571,857, filed on May 16, 2000, now U.S. Pat. No. 6,372,270.

BACKGROUND OF THE INVENTION

1. Field of the Invention

The present invention relates generally to devices and mixes for preparing relatively small quantities of a beverage within a container, and more specifically to various embodiments of a beverage container which includes a quantity of water and a separate quantity of a beverage mix or preparation (powdered drink mix, tea, etc.) therewith. The present container is relatively low and wide with a relatively large mouth to facilitate the consumption of heated beverages therefrom, and to retain heat more efficiently than other container shapes. The consumer mixes the beverage mix provided with the water contained within the container and heats the mix as desired, or vice versa, to produce a heated beverage.

2. Description of the Related Art

Flavored beverages of all types have become increasingly popular, with dozens of different flavors, containers configurations, and quantities available at almost every retail outlet in the U. S. In addition to such flavored beverages (sodas, fruit drinks and ades, tea, etc.), bottled spring water has also become increasingly popular.

It is generally recognized that at least in the case of some beverages (e. g., tea), that preparation of the beverage immediately before consumption results in a fresher and higher quality drink. Yet, all such prepackaged beverages of which the present inventor is aware, are provided in a premixed state in their containers. Moreover, while some beverages which have been traditionally served heated in the past are also provided chilled or at room temperature (with tea again serving as an example), the present inventor is unaware of any beverages sold in sealed containers at the retail level, which have containers adapted for heating the beverage therein.

Accordingly, a need will be seen for a combination beverage preparation and dispensing container, which includes a quantity of water and a separate beverage mix (e. g., tea bag, powdered drink mix or syrup, etc.) which is to be mixed with the water in the container at the time the beverage is to be consumed. The present container is also specifically adapted for heating, particularly in a microwave oven, and for consuming a heated beverage therefrom without hazard to the consumer.

A discussion of the related art of which the present inventor is aware, and its differences and distinctions from the present invention, is provided below.

U.S. Pat. No. 180,132 issued on Jul. 25, 1876 to Benjamin F. Hoard et al., titled "Bottle Attachment," describes a bottle for containing a liquid (medicine, etc.). The bottle has a relatively narrow neck and a concave side with flanges extending therefrom, along which a cooperating lid may be slid into place. The resulting receptacle provides for the insertion of an information or advertising brochure or other document therein. The bottle and external container of the present invention differ in that (1) no separate rigid closure need be provided, as the present closure is formed by the bottle label; and (2) the mouth of the present container is considerably wider, for convenience in consuming a heated beverage directly from the container.

U.S. Pat. No. 1,489,806 issued on Apr. 8, 1924 to Harry C. Anderson, titled "Paper Container Or Receptacle," describes various shapes of perforated paper elements for holding tea and for submersing in a container of hot water for brewing tea. The Anderson tea containers teach away from the "tea balls" of the prior art, which are formed as openable rigid, hard, perforated metal shells. However, Anderson does not provide a sealed container having water or other liquid therein along with his tea infuser device, as is provided by the various embodiments of the present beverage preparation and dispensing container invention.

U.S. Pat. No. 3,102,465 issued on Sep. 3, 1963 to Lewis Montesano, titled "Leak-Proof Packaging Infusion Unit," describes a telescoping tubular device in which the outer sleeve forms a cover for the perforated inner sleeve surrounding the tea contents therein. The outer sleeve is extended beyond the inner perforated sleeve, and the perforated sleeve is immersed in the water to diffuse the tea therein. As in the devices of the Anderson '806 U.S. Patent, the Montesano device does not include a string or other means allowing it to be released in a container; rather, the Montesano device must be held in the container during the time the tea is steeping. This renders the Montesano device unsuitable for use in heating the container and beverage in a microwave or other heating device, while the present beverage container and contents are particularly configured for microwave heating. Also, Montesano does not provide a sealed container of water with his tea infuser, whereas the present invention includes both water and beverage mix in a single package.

U.S. Pat. No. 3,346,388 issued on Oct. 10, 1967 to Frederick P. Andrews et al., titled "Tea Packet," describes a specially formed tea bag having a toroidal configuration. While the Andrews et al. tea bag is configured for use in a tea cup (column 1, lines 46–47), Andrews et al. do not provide a sealed container of water along with their tea bag in a single package, as is provided by the present beverage preparation and dispensing U.S. Pat. No. 3,590,989 issued on Jul. 6, 1971 to John C. Wittwer, titled "Protective Bottle Display And Shipping Container," describes a double bottle type container, in which a glass container is encased within a liquid filled plastic container for shock absorption purposes. Wittwer discloses other articles encased in a separate compartment within an outer bottle, but the receptacle is in the center of the bottle, rather than being formed in the outer wall of the bottle, as in the case of the present invention. Moreover, the Wittwer bottles all have relatively narrow necks which result in difficulty in consuming a heated beverage therefrom.

U.S. Pat. No. 3,657,994 issued on Apr. 25, 1972 to Norman W. Post, titled "Combination Container And Dispenser," describes a small, double walled container which hooks over the edge of a cup. The two walls are perforated, and may be turned relative to one another to align the perforations for allowing a drink mix contained therein to be diffused through the liquid in the cup. The Post device does not include a sealed beverage container which already includes water for mixing the beverage, as provided by the present invention.

U.S. Pat. No. 3,732,999 issued on May 15, 1973 to Rodney G. Rounkles, titled "Bottle With External Compartment," describes a bottle having a hinged lid for closing over a compartment formed in the side of the bottle.

The device is more closely related to the bottle of the Hoard et al. '132 U.S. Patent discussed further above, than to any of the embodiments of the present invention.

U.S. Pat. No. 3,861,284 issued on Jan. 21, 1975 to Albert D. Costello, titled "Cup Lids For Use With Teabags And The Like," describes various lid embodiments having a wide, flat protrusion for holding a conventional flat tea bag therein. The tea bag is lowered into the water in the cup and allowed to steep, then drawn back upwardly into the protrusion by means of the conventional string on the tea bag. It should be noted that in each of the embodiments of the Costello cup lid, that the upstanding portion of the lid intended for holding the beverage mix packet (i. e., tea bag) communicates directly with the underlying volume within the cup or container. Even if the Costello lids were configured for sealed installation to the underlying cup to seal a quantity of water therein, the liquid within the cup would mix with the beverage mix in the upstanding portion of the lid during movement of the container, e. g. during shipping and handling, causing the beverage to be mixed before dispensing or purchase.

U.S. Pat. No. 4,235,343 issued on Nov. 25, 1980 to Harold E. Thompson, titled "Container Assembly," describes a group of three bottles, with the larger bottle having depressions in opposite sides for seating two smaller bottles. No means is disclosed for securing the smaller bottles in the depression, other than providing a tight fit, which is not possible with the flaccid tea bag unit for storage in the depression of a container of the present invention. Moreover, the Thompson bottles each have relatively narrow necks, which are not suitable for consuming a heated beverage from.

U.S. Pat. No. 4,551,336 issued on Nov. 5, 1985 to Ying-Cheng Chen, titled "Infusion Bag," describes a tea bag or the like having a double opposed conical configuration. Chen does not disclose any form of sealed or other container containing a presupplied quantity of water for use with his tea infusion bag, whereas the present invention includes both a quantity of water in a sealed container as well as a beverage mix therewith.

U.S. Pat. No. 4,592,478 issued on Jun. 3, 1986 to Richard Laconis, titled "Container Assembly," describes two narrow necked, mirror image outer containers defining a cavity therein when assembled together. The cavity is used to hold another article, and/or container for the other article, therein. The outer containers must be separated from one another to access the article contained within their mutual depressions, unlike the present container with its external depression. The Laconis container assembly thus more closely resembles the devices of the Wittwer '989 and Thompson '343 U.S. Patents, than the present invention.

U.S. Pat. No. 4,821,630 issued on Apr. 18, 1989 to Robert E. Roberts, titled "Sun Tea Adapter For Plastic Cartons," describes a cylindrical perforated insert for placing within a conventional plastic milk jug or the like. Tea bags may be placed within the insert, which is then lowered into the water filled jug to steep and make sun tea. Roberts does not provide a sealed container having a quantity of water therein in combination with his adapter, whereas the present invention includes a sealed liquid container and separate beverage mix for use therewith, in a single package.

U.S. Pat. No. 4,986,451 issued on Jan. 22, 1991 to Christopher H. Lowe et al., titled "Dispensing Device For Soluble Or Dispersible Material," describes two embodiments of such a device. In one embodiment, a perforated straw-like device is filled with a powdered material for mixing in a liquid. The straw is stirred to dispense the material through the perforations. The second embodiment is similar, but includes a separate sealed compartment containing another additive. Squeezing the sealed compartment causes a seal to rupture, allowing the additive to flow into the perforated compartment where it disperses through the liquid along with the material in the perforated compartment. Neither of the above embodiments discloses any form of container for use therewith, either of wide mouth or narrow neck configuration. More particularly, no container having a sealed quantity of water or liquid therein for mixing with the Lowe et al. infuser is disclosed by Lowe et al.

U.S. Pat. No. 5,050,757 issued on Sep. 24, 1991 to Daniel P. Hidding et al., titled "Container System," describes al relatively larger bottle having a recess in one side thereof for frictionally holding a smaller bottle therein. The assembly provides for placement of a relatively smaller supply of medication from the larger bottle into the smaller bottle for convenient carriage. The Hidding et al. bottle assembly more closely resembles the assembly of the Thompson '343 U.S. Patent discussed further above, than any embodiments of the present invention.

U.S. Pat. No. 5,318,791 issued on Jun. 7, 1994 to Paul Millman et al., titled "Apparatus And Method For Cold Water Infusion Of Beverage And Sweetener," describes a special lid assembly having a central post to which a cylindrical column may be secured. The cylindrical column provides for anchoring one or more tea bags thereto, and includes a sweetener diffusion compartment to one side thereof. The apparatus is assembled, and the tea and sweetener are diffused through the water within the container or cup. The Millman et al. apparatus does not include any means for keeping the beverage mix separated from the liquid within the container, and thus cannot keep the mix fresh until deliberately mixed by the consumer, as provided by the present beverage preparation and dispensing container invention.

U.S. Pat. No. 5,623,865 issued on Apr. 29, 1997 to Perry Sidiropoulos, titled "Infuser," describes multiple embodiments of a generally cylindrical telescoping device having a porous tube at its lower end and an impervious outer tube for telescoping over the porous tube. The porous tube is filled with tea or the like, with the outer tube covering the porous tube. For using the device, the outer tube is extended to expose the porous tube, which is inserted into the water to diffuse the tea into the water. The Sidiropoulos device thus more closely resembles the device of the Montesano '465 U.S. Patent discussed further above, than the present invention. Sidiropoulos does not disclose any form of sealed container having a predetermined quantity of water therein for use with his infuser, as provided by the present beverage preparation and dispenser.

U.S. Pat. No. 5,746,113 issued on May 5, 1998 to Lily Ko, titled "Infusion Vessel," describes a cup having a perforated tea holding compartment therewith, either formed integrally with the cup or as a removable compartment. The Ko device thus more closely resembles the apparatus of the '994 U.S. Patent to Post, discussed further above, than it does the present invention.

U.S. Pat. No. 5,866,185 issued on Feb. 2, 1999 to Edward K. Burkett, titled "Method And Device For Dispensing An Ingestible Soluble Material For Further Dissolving In A Liquid," describes a device having a porous cylindrical wall and containing a dry soluble material therein. The outer surface of the tube is coated with a sweetener or other soluble substance. When the device is immersed in water, flow through the porosities diffuses the substance within the tube through the water, with the outer coating also dissolving. The Burkett device thus more closely resembles the device of the '451 U. S. Patent to Lowe, discussed further above and cited as prior art by Burkett, than it does the present invention.

U.S. Pat. No. D-100,412 issued on Jul. 14, 1936 to Bernard Carp, titled "Combination Recessed Bottle," illustrates a design for a relatively larger bottle having a recess with a smaller bottle set within the recess of the larger bottle. The bottle neck is much smaller than the mouth of the present container. The Carp design thus more closely resembles the combination bottle apparatus of the Thompson '343 and Hidding et al. '757 U.S. Patents, than it does the present bottle with its inset wall and label enclosure.

British Patent Publication No. 480,596 accepted on Feb. 22, 1938 to Frederick J. E. Alexander, titled "Improvements In Tea, Coffee Or Like Infusers," describes a rigid container having an impervious bottom and a perforated or screened top portion. Tea, coffee, etc. is placed within the device, which is then closed and immersed in hot water. Alexander does not disclose any form of liquid container with which his infuser may be used, much less provision of a sealed container of bottled water or the like which may be used in combination with his device. As the Alexander device is formed of metal for reusability, it could not be economically used with an inexpensive presealed container of the present invention as a mix infuser, and thus teaches away from the present beverage preparation and dispensing container invention.

British Patent Publication No. 623,195 accepted on May 13, 1949 to Winifred M. Waller et al., titled "Improvements In And Relating To Solvent Extraction Devices," describes a rigid container having porous walls, for immersion into a container of hot water. An elongate handle extends from the top of the device. The device is relatively wide and is intended for use in a container having a relatively wide mouth, such as a tea or coffee cup or pot. As in the case of the Alexander '596 British Patent Publication discussed immediately above, Waller fails to disclose any form of sealed liquid container for use with her infuser. The Waller et al. device more closely resembles the infuser of the '596 British Patent Publication to Alexander, described immediately above, than it does the present invention.

European Patent Publication No. 158,511 published on Oct. 16, 1985 to General Foods Limited, titled "Beverage Infuser Device," describes a low, flat, porous, disposable container including tea or coffee therein. A handle extends from one side of the device for ease of manipulation. The General Foods device is intended for placement within a cup or container of hot water for brewing a single serving of tea or coffee. However, no disclosure is made of a previously sealed container of water specially configured to hold a dry or concentrated beverage mix therewith as an assembly until mixing the beverage mix with the water for consumption, as provided by the present beverage preparation and dispensing container invention.

Finally, British Patent Publication No. 2,250,425 published on Jun. 10, 1992 to Francis C. Winnington-Ingram, titled "Tea Infusor For Cups And Mugs," describes a rigid framework having porous panels therein for containing tea or similar drink mix. No disclosure is made of any form of presealed liquid container provided with or for use with the infusor. Moreover, the Winnington-Ingram device is not economically disposable and does not contain a sealed quantity of tea or other drink mix therewith, as provided by the present infuser device.

None of the above inventions and patents, taken either singly or in combination, is seen to describe the instant invention as claimed.

SUMMARY OF THE INVENTION

The present invention comprises various embodiments of container and beverage mix assemblies for making individual servings of tea, coffee, fruit flavored drink from a mix, or other beverages. The present containers are particularly adapted for heating in a microwave oven or the like, as opposed to receiving passive solar heat as in the brewing of "sun tea" or the like.

The present containers are relatively squat and wide, providing a good ratio of internal volume per unit of surface area. This serves to better retain the heat within the liquid which is contained within the container, thus keeping the brewed or mixed beverage warmer for a longer period of time. The container walls and base are also relatively thick, in order to retain heat more efficiently. Each container includes a handle formed of solid material to avoid flow of the hot liquid therethrough.

The present containers each have a relatively wide mouth, thus enabling a person consuming a liquid from the container to sip it slowly and presents a larger surface area exposed to the air for cooling the beverage, thus avoiding ingesting a large quantity of the liquid at once and burning the mouth, as might occur when drinking from a narrow necked bottle. While the present invention is primarily directed to personal size water bottles each containing a single individual beverage serving, it will be seen that it may be extended to other container types and sizes and may include other beverages as well.

One embodiment comprises a beverage mug or cup containing water (spring water, distilled water, etc.) therein. The container is sealed and includes a packet of beverage mix adhered to the side, e. g., beneath a label. The container seal is broken, the beverage mix placed in the container, and the container is heated to brew the beverage (tea, coffee, etc.). Alternatively, the container may be heated before mixing the beverage therein.

In another embodiment, a container is provided with a depression or receptacle formed in one side thereof. The receptacle provides for containment of one or more tea bags, powdered drink mix packages, etc. The bottle label wraps over and around the receptacle to seal the contents therein. The label may include weakening perforations and/or a pull tab to facilitate access to the contents of the receptacle in the side of the bottle.

In yet another embodiment, the prepackaged beverage mix may be removably secured to the lid of the container. The lid may be a relatively rigid plastic material sealed in place with weakening or tear lines provided therein, or may be a threaded lid secured to the container top by cooperating threads about the container neck.

Still another embodiment includes a label having a pocket formed therein or between the label and the side of the bottle. The drink mix package(s) or tea bag(s) is/are enclosed within the pocket, or between the label and the side of the bottle. The label may include accordion or fan fold sides which expand when the label is opened. The opened label thus provides a receptacle for a used tea bag or the like after mixing or brewing the beverage.

Accordingly, it is a principal object of the invention to provide improved methods and apparatus for making or brewing individual servings of a beverage.

It is another object of the invention to provide an improved apparatus for making or brewing such beverages, comprising a short, squat container having a high internal volume to surface ratio and a relatively thick wall for more efficient heat retention, with a solid handle to preclude the passage of heated liquid therethrough.

It is a further object of the invention to provide an improved apparatus including a beverage container having a predetermined quantity of water therein and a beverage mix therewith, with the bottle including a pocket or the like formed in one side thereof, and a label extending over the pocket and securing one or more drink mix or tea packets therein.

An additional object of the invention is to provide an improved apparatus comprising a drink container with drink mix included therewith, with the drink mix being sealed to the bottle by means of a label having a pocket therein.

Still another object of the invention is to provide an improved drink container including a consumer openable seal disposed beneath a solid lid having weakening lines therein or beneath a lid or cap threadedly attached to the container top.

Yet another object of the invention is to provide an improved drink container including a supply of water therein, with a packet of drink mix secured to the outer surface of the container lid.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of a device or apparatus for making or brewing individual servings of a mixed or brewed beverage, such as tea, instant coffee, or a drink made from a powdered or syrup mix. In each of the embodiments, the invention includes a bottle or other container of potable water, along with an appropriate quantity of tea or other drink mix to be brewed or mixed with the water, using the bottle or container as the mixing or brewing container.

In a first embodiment, a beverage mix packet is adhesively secured to the outer surface of the container, beneath a label which extends at least partially around the circumference of the container. In a second embodiment, a pocket is formed in the side of the container or bottle, with the beverage packet residing within the pocket and a closure provided over the packet and pocket. In a third embodiment, the beverage mix packet is secured to the top of the lid or closure of the container, which lid may have a threaded attachment, or may comprise a frangible material for separation from the rim of the container.

Each of the container configurations is formed of a material which is safe for heating in a microwave oven, and includes a solid handle extending from one side. The solid material of the handle precludes flow of heated water or other beverage therethrough, thus remaining relatively cool to the touch after the container and its contents have been heated in a microwave oven.

Figure 1:
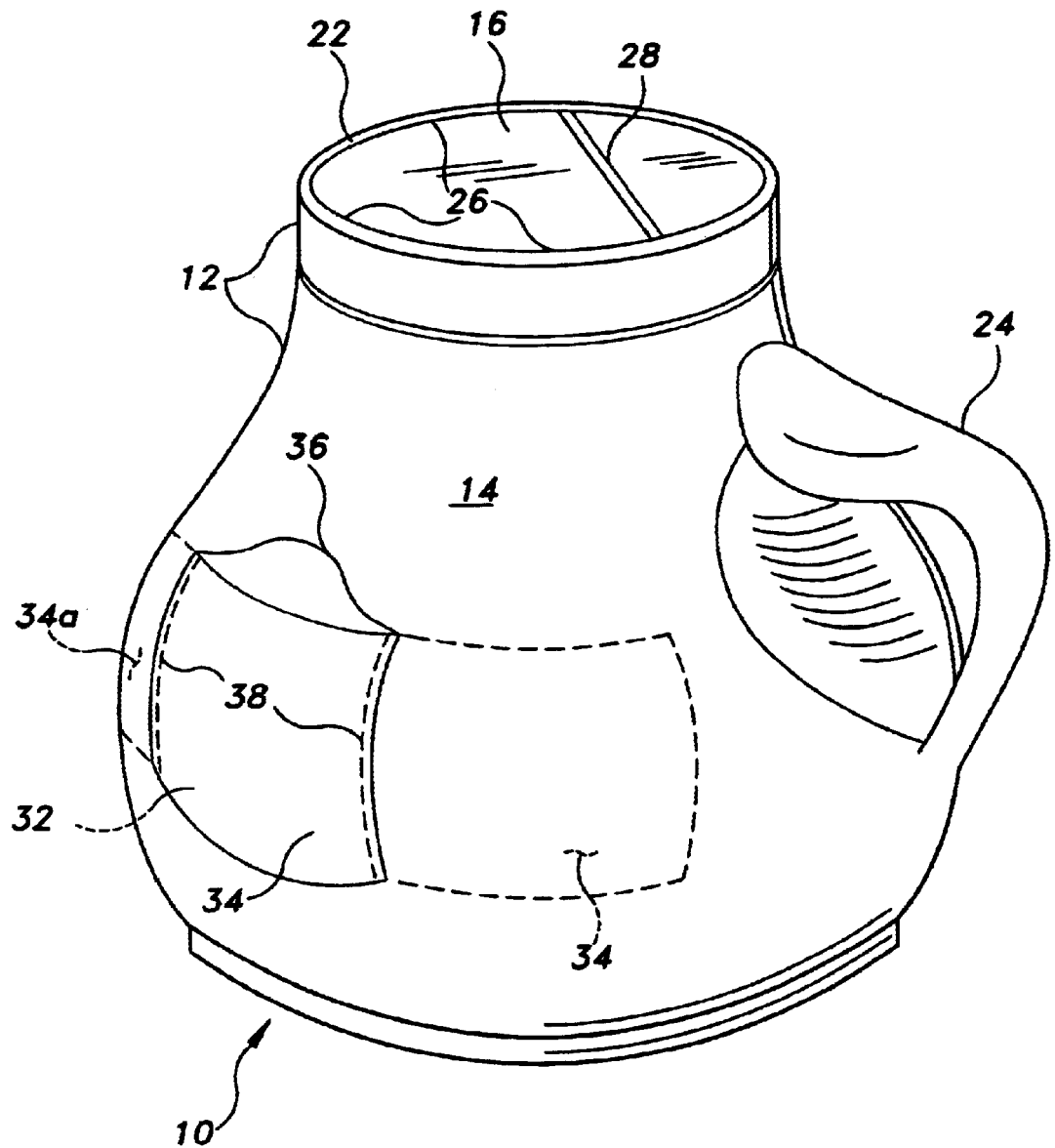
FIG. 1 is a perspective view of a first embodiment of a beverage preparation and dispensing container according to the present invention, before opening and use.
Figure 2:
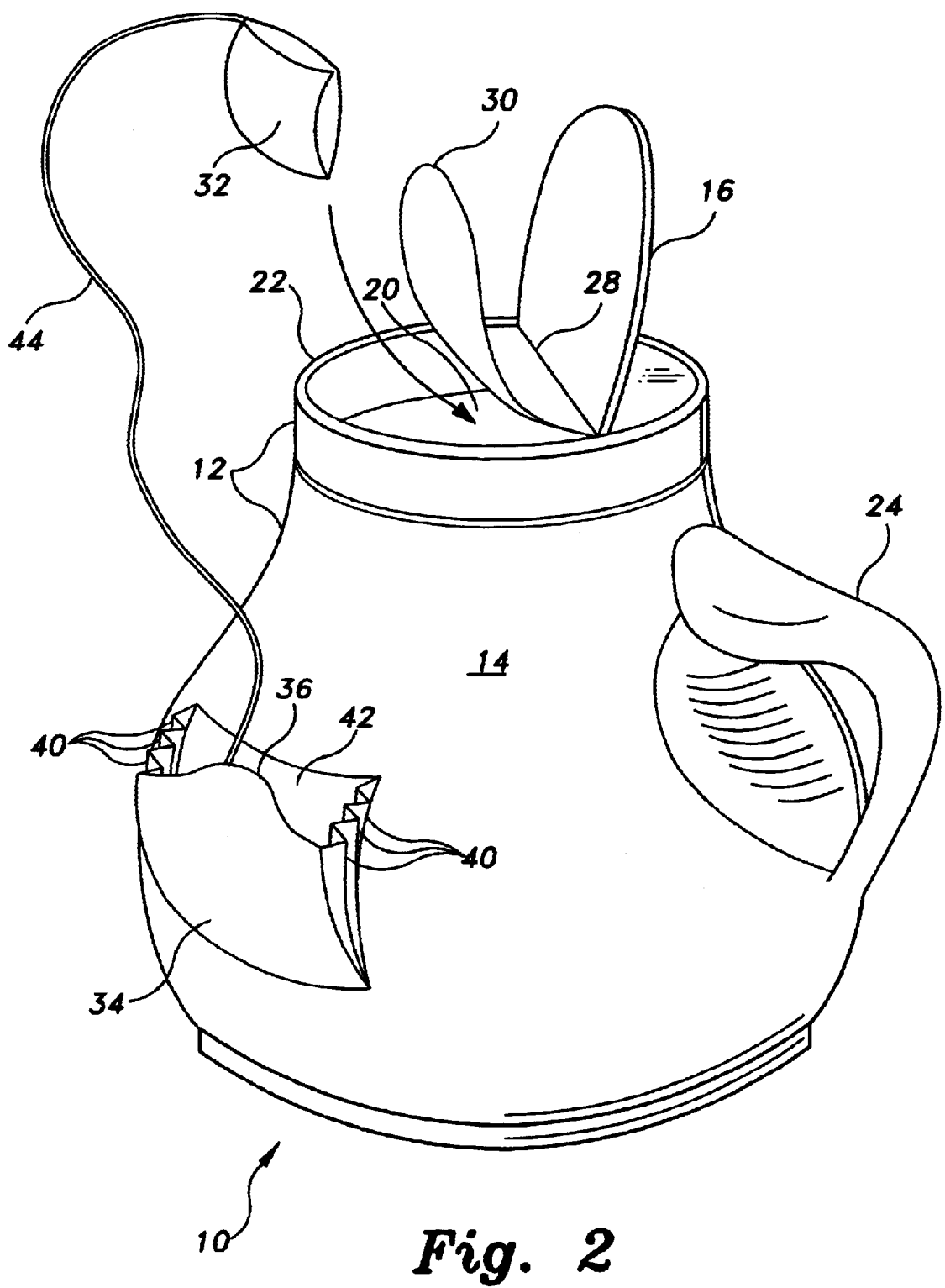
FIG. 2 is a perspective view of the container embodiment of FIG. 1, showing its use.
Figure 3:
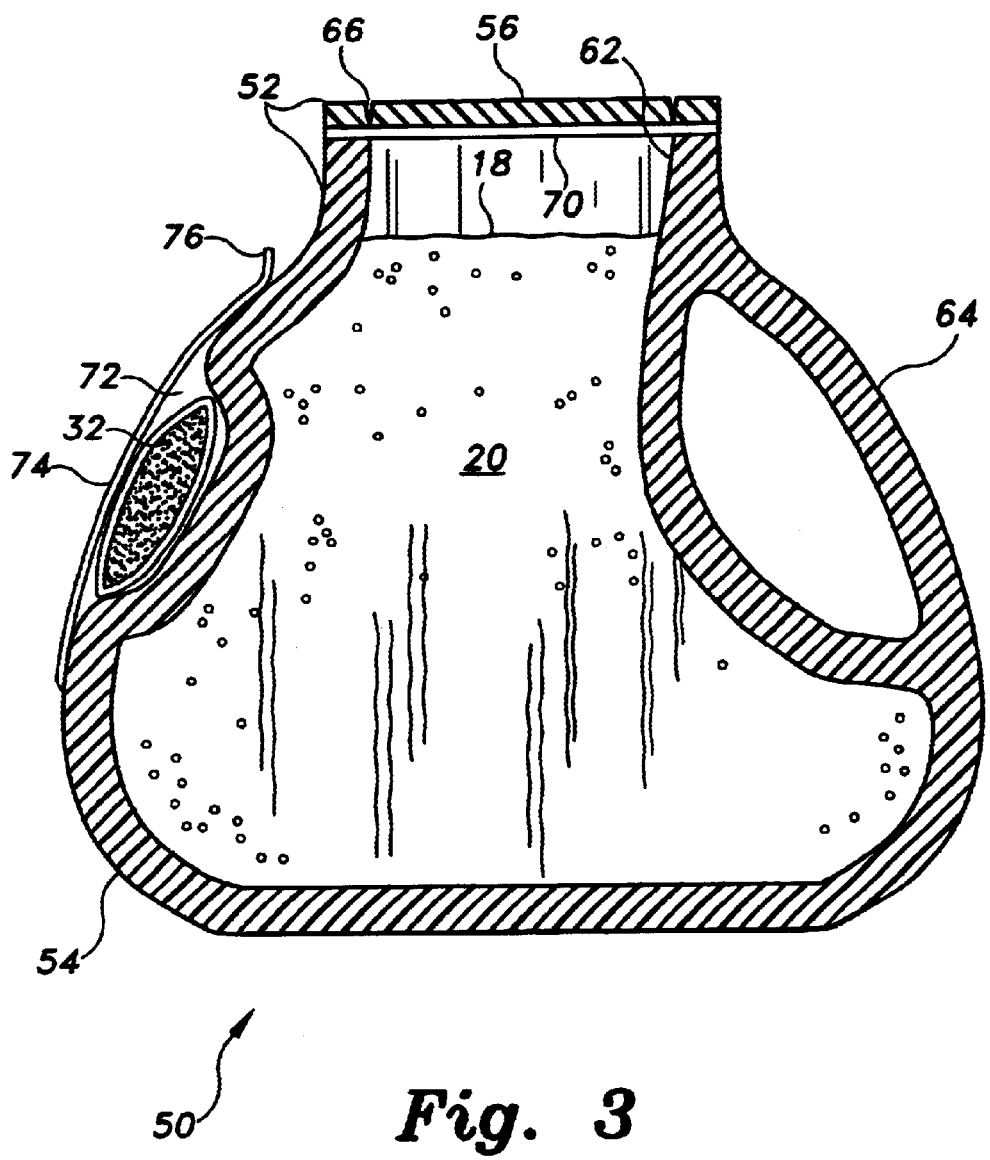
FIG. 3 is a front elevation view in section of an alternative embodiment of the present container, wherein an external pocket is provided for a packet of beverage mix.

FIGS. 1 and 2 of the drawings illustrate a first embodiment container 10 in accordance with the present invention. The sealed, liquidproof container 10 of FIGS. 1 and 2 comprises an external shell 12 which in turn includes a container wall 14 and an upper closure 16, for sealing a quantity of potable water 18 within the internal volume 20 thereof, as shown in the embodiment of FIG. 3.

The container 10 includes a relatively wide mouth 22, to allow a consumer of the heated water or beverage therein to sip the liquid slowly and also to present a larger surface area exposed to air to cool the liquid slightly drinking the beverage. The present container 10 (and other embodiments) thus enables the consumer to sip a heated liquid therefrom without danger of burning the mouth of the consumer, as would occur in the case of a bottle or the like having a relatively narrow neck. While such narrow neck containers are fine for the consumption of cold or slightly warm beverages, they can pose a hazard with beverages which have been heated to a great extent. Accordingly, the neck or mouth 22 of the container 10 preferably has a diameter on the order of two to three inches (although other sizes may be used as desired), to preclude the consumer being able to seal the entire opening of the container against his or her lips during ingestion of the beverage within the container. A solid handle 24 is formed integrally with the container wall 14 and extends outwardly therefrom. Such a solid handle 24 configuration precludes flow of a heated liquid therethrough, thus remaining relatively cool to the touch when the container 10 and contents 18 are heated in a microwave.

The shape of the present container 10 is well adapted for efficient retention of the heat of a heated beverage. The container 10 will be seen to have a relatively short, squat configuration, with a width or diameter and height of approximately the same dimensions. The container 10 shape thus very roughly approximates a sphere, which is the optimum three dimensional geometric shape for maximizing internal volume while minimizing external surface area. The present container 10, with its short squat shape approximating a spherical shape, thus provides a high ratio of internal volume 20 to external surface area of the shell 12, in order to reduce heat losses from the container 10. The container wall 14 is formed of a microwave safe material (various plastics are preferred, although glass or other material may be used) and is relatively thick, as shown clearly in FIG. 3 of the drawings, in order to provide further heat retention efficiencies.

The openable closure 16 of the container 10 may comprise a semirigid plastic sheet of material having peripheral and lateral lines of weakening, respectively 26 and 28, therearound and thereacross. A person using the present container 10 need only break the peripheral weakening line 26 about a portion of the periphery of the closure 16, using the lateral weakening line 28 as a live hinge to allow the openable portion of the closure 16 to be lifted, as shown in FIG. 2 of the drawings. A hygienic and liquidproof seal 30 is provided beneath the closure 16 for further security of the contents, with the seal 30 being lifted for access to the liquid 18 within the container 10, as shown in FIG. 2.

The container 10 is also provided with a beverage drink mix packet 32, with the packet 32 being secured externally to the container 10 in some manner. In the embodiment of FIGS. 1 and 2, the packet 32 is adhesively secured to the container wall 14 beneath a label or protective seal 34, which may extend only over the packet 32 (as indicated by the solid lateral lines shown in FIGS. 1 and 2) or which may extend about a greater portion of the container wall 14, as indicated by the label 34a portions shown in broken lines in FIG. 1.

The beverage is prepared as illustrated in FIG. 2 of the drawings, by opening the label 34 or other protective seal over the packet 32 by means of a pull tab 36. The label or seal 34 preferably includes lateral perforations 38, shown in FIG. 1, allowing the label or seal 34 to be pulled outwardly open from its upper edge, generally as shown in FIG. 2. A series of pleated lateral panels 40 may be provided along each edge of the label or seal 34, providing a wide pocket 42 once the label or seal has been broken to extract the beverage packet 32 therefrom. A string or line 44 is secured from the beverage packet 32 (e. g., tea bag, etc.) to some point on the container 10 (e. g., attached inside the pocket 42, or around the rim of the mouth 22 or about the handle 24, etc.) for retrieving the exhausted packet 32 after use. Alternatively, the packet 32 may be opened, the contents dispensed into the container 10 through the opened closure 16 and seal 30, and the depleted packet 32 placed in the pocket 42 to avoid litter.

FIG. 3 illustrates a front elevation view in section of a second embodiment of the present beverage preparation and dispensing container, designated as container 50. The container 50 is configured essentially the same as the container 10 of FIGS. 1 and 2, having an external shell 52 comprising a container wall 54 and upper closure 56 enclosing an internal volume 20 containing potable water 18 or alternatively some other beverage therein. The container 50 has a relatively wide mouth 62, with a shape or configuration much like that of the container 10 of FIGS. 1 and 2 for maximizing heat retention of a liquid heated therein. A solid handle 64 extends from one side of the container wall 54, to facilitate handling the container 50. The lid or closure 56 with its peripheral weakening line 66 and inner seal 70 are essentially identical to the corresponding components 16, 26, and 30 illustrated in FIGS. 1 and 2 and described further above.

The container 50 of FIG. 3 differs from the container 10 of FIGS. 1 and 2, in that the container 50 includes a beverage packet mix containment receptacle 72 formed integrally in the outer container wall 54. The receptacle 72 serves as a storage area for a packet 32 of beverage drink mix, with a label or other protective seal 74 being applied over the receptacle 72 and beverage packet 32 to seal the packet 32 in place. This configuration has the advantage of placing the beverage packet 32 within the outer circumference or surface of the container 50, thus avoiding potential damage to the beverage packet 32 due to its otherwise protruding from the surface of the container.

The packet 32 within the receptacle 72 is accessed in much the same manner as that used to access the packet 32 of the container 10 of FIG. 1, i. e., pulling outwardly and downwardly on the tab 76 to remove the label 74 or other protective covering from over the receptacle 72. The beverage packet 32 or mix therein is then introduced into the container 50 in the same manner as used for the container 10, i. e., opening the closure 56 along the peripheral weakening line 66 and opening the underlying seal 70 to access the container interior 20. The beverage packet 32 (or its contents) may then be dispensed into the water 18 within the interior 20 of the container 50, to mix and/or brew a beverage therein.

Figure 4:
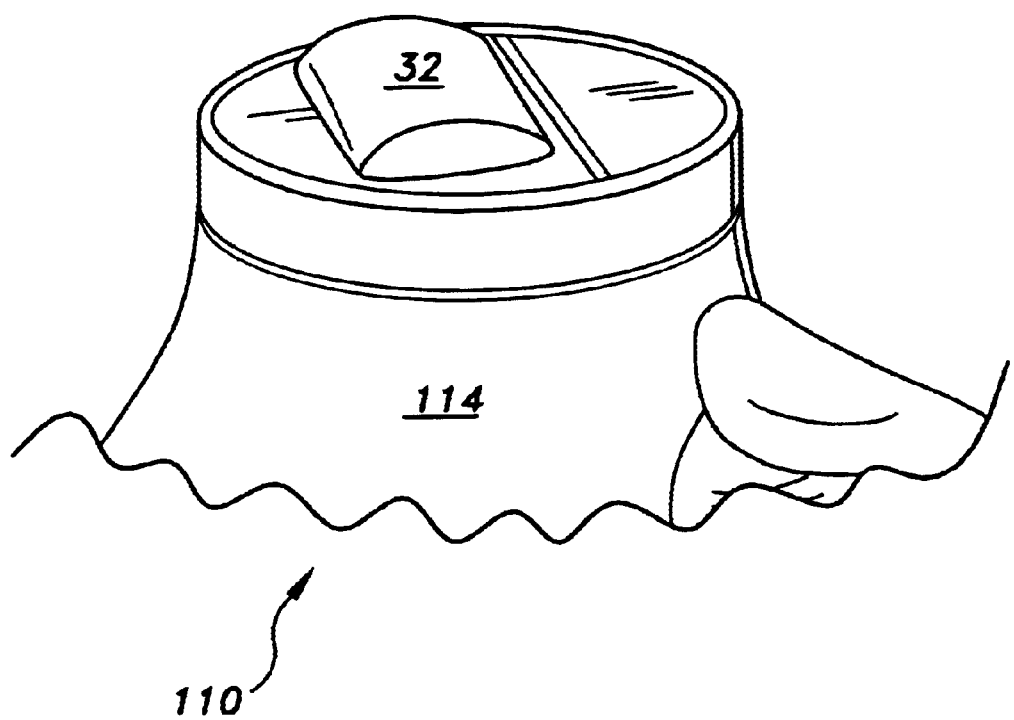
FIG. 4 is a front and top broken away perspective view of the upper portion of another embodiment of the present container showing the attachment of a drink mix packet to the cap thereof.

FIG. 4 illustrates yet another variation on the present beverage container theme, with the container 110 of FIG. 4 having a configuration much like that of the container 10 of FIGS. 1 and 2. Accordingly, it is not necessary to show the lower portion of the container 110 of FIG. 4. The difference between the container 110 of FIG. 4 and the container 10 of FIGS. 1 and 2, is in the location of the beverage packet 32 therewith. The container 110 of FIG. 4 has the beverage packet 32 adhesively secured directly to the outer surface of the upper closure panel 116, rather than securing it to the wall 114 of the container. The method of securing the packet 32 directly to the closure 116, with no overlying label or other protective seal, may also be applied to the container 10 of FIGS. 1 and 2, if so desired, or a protective seal (not shown, but similar to the seal or label 34 of container 10 of FIGS. 1 and 2) may be applied over the packet 32.

Figure 5:
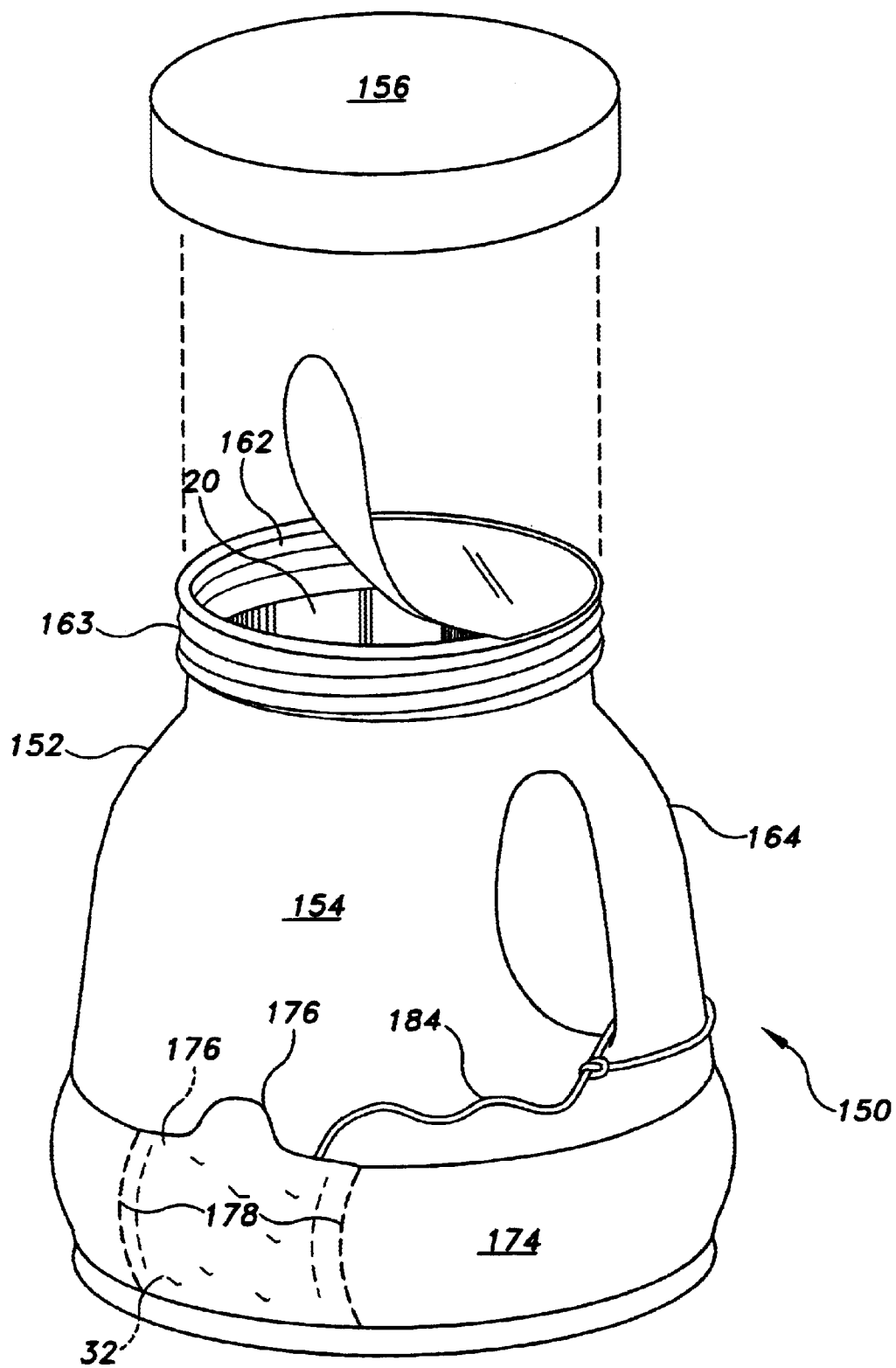
FIG. 5 is an exploded perspective view of yet another embodiment of the present container, including alternative cap or lid attachment means and drink mix attachment means.

FIG. 5 illustrates yet another embodiment of the present beverage preparation and dispensing container, designated as container 150. The container 150 is similar to the container 10 of FIGS. 1 and 2, having an external shell 152 comprising a container wall 154 and upper closure 156 enclosing an internal volume 20 containing potable water 18 (shown in FIG. 3) or some other beverage therein. The container 150 has a relatively wide mouth 162, with a shape or configuration much like that of the container 10 of FIGS. 1 and 2 for maximizing heat retention of a liquid heated therein. A solid handle 164 extends from one side of the container wall 154, to facilitate handling the container 150.

One major difference between the container 150 of FIG. 4 and other containers of the present invention, is the configuration of the mouth 162 and upper closure 156. It will be seen that the rim of the mouth 162 of container 150 has external threads 163, with the upper closure 156 having conventional mating internal threads (not shown). This enables the container 150 to be resealed, if so desired, after initially opening and mixing or brewing a beverage therein. The threaded attachment of the lid 156 has another advantage, in that the tight sealing provided by such a threaded attachment serves to retain the heat and freshness of the beverage therein to a better extent than the non-reclosable lids or closures of other containers disclosed herein. While the present invention is directed primarily to containers and contents of single, individual servings, it may be expanded to larger containers, with the reclosable lid 156 being of value in such containers.

The container 150 also has a slightly different shape than the containers 10, 50, and 110 discussed further above. The container 150 will be seen to have a somewhat wider base, to provide greater stability for the container 150. The wider base also provides an area beneath the handle 164 for completely encircling the container 150 with a label 174, protective seal, or other packaging as desired, for sealing or retaining the beverage packet 32 therein. This circumferential band or label 174 may be formed of a relatively thick insulating material, such as a foam plastic, if so desired, in order to provide further heat retention for a heated beverage within the container 150.

A pocket 182 may be formed in the circumferential label or wrap 174, in much the same manner as that of the label 34 of the container 10 of FIGS. 1 and 2. The portion of the label 174 extending across the beverage mix pocket 182 may include perforations 178 along each lateral edge thereof, to allow the pocket 182 to be opened by pulling the tab 176. The container 150 with its beverage packet 32 is used in the same manner as that described further above in the discussion of other containers of the present invention. A retaining string or line 184 may be provided to retrieve the depleted packet 32 from the interior of the container 150, if it is not desired to leave the packet 32 in the container 150.

In conclusion, the present beverage preparation and dispensing container invention provides a novel means for persons desiring a hot beverage to mix or brew that beverage immediately before consuming the drink. The present invention provides all the required elements of such a drink, excepting the energy for heating the contents of the container. The present container in its various embodiments, is specifically configured for containing a single individual serving of a heated beverage, with its approximation of a spherical shape and thick container wall for retaining heat and wide mouth for sipping small quantities of a heated beverage to avoid burning the mouth of the consumer. The provision of a tea bag or other beverage mix packet with the present water filled container, enables the consumer to prepare a fresh drink "on the spot," needing only to heat the beverage in a microwave oven or other suitable heating appliance, in order to enjoy a freshly brewed and heated drink.

It will be seen that additional means may be provided for heating the beverage within the container, and also for retaining the heat within the container. For example, a microwave energy absorbing insert (e. g., metal disc, etc.) may be cast integrally or otherwise placed within the base of the container wall, to absorb microwave energy and produce additional heat to heat the contents of the container more efficiently. Such a disc may comprise the bottom surface of the container, and serve as a heat distribution device for heating the container on a small hot plate, which may be provided as an accessory to the present container.

Alternatively, or in addition, a separate insulating base may be provided with or as an accessory to the present container. The insulating base may extend beneath the container for resting the container thereon, and perhaps include walls extending slightly up the sides of the container to provide some slight additional heat retention. The insulating base may be formed of a light weight foam plastic material, and may include a weight therein in order to retain its position on the underlying surface when the present container is lifted therefrom. Regardless of the accessories or additional features noted immediately above, the present beverage preparation and dispensing container invention provides a much needed means of providing an individual serving of a freshly mixed or brewed, heated beverage to the consumer, providing much greater portability and convenience for such drinks.

It is to be understood that the present invention is not limited to the embodiments described above, but encompasses any and all embodiments within the scope of the following claims.

I claim:

1. A beverage preparation and dispensing apparatus comprising:

a container having a relatively wide mouth and an external shell wall defining an internal volume a packet of beverage drink mix removably attached to the shell wall of said container;

a seal removably attached over the mouth of said container;

a quantity of potable water removably sealed within the internal volume of said container;

an upper closure disposed over said seal and covering the mouth of said container, said closure having a periphery and including a peripheral line of weakening extending around a portion the periphery and terminating at a lateral line of weakening extending across the periphery of the closure; and a solid handle integrally formed with and extending from the shell wall of said container;

whereby, a beverage is prepared by breaking the peripheral line of weakening to hingedly open the closure about the lateral line of weakening, lifting the seal to gain access to the quantity of water within the container, and placing the contents of the packet of drink mix in the water.

2. The beverage preparation and dispensing apparatus according to claim 1, wherein said container is made of a microwave-safe material.

3. The beverage preparation and dispensing apparatus according to claim 1, wherein the wall of said container is of sufficient thickness to provide good insulation and heat retention properties for the quantity of potable water when heated therein.

4. The beverage preparation and dispensing apparatus according to claim 1, wherein said packet of beverage drink mix is removably and adhesively secured to the wall of said container.

5. The beverage preparation and dispensing apparatus according to claim 1, wherein said packet of beverage drink mix is removably secured beneath a label at least partially surrounding the wall of said container.

6. The beverage preparation and dispensing apparatus according to claim 1, wherein the mouth of said container has a diameter of about two to three inches.

7. The beverage preparation and dispensing apparatus according to claim 1, wherein said closure is made of a semi-rigid plastic material.

8. The beverage preparation and dispensing apparatus according to claim 1, wherein said container has a height and a diameter approximately the same as the height.

* * * * *